United States Patent
Kojima (10) Patent No.: US 6,584,872 B1
(45) Date of Patent: Jul. 1, 2003

(54) BICYCLE HANDLE MOUNTING MEMBER (75) Inventor: Masao Kojima, Izumi (JP)

(73) Assignee: Shimano Inc., Osaka (JP)

( * ) Notice: Subject to any disclaimer, the term of this patent is extended or adjusted under 35 U.S.C. 154(b) by 45 days.

(21) Appl. No.: 09/699,467

(22) Filed: Oct. 31, 2000

(51) Int. Cl.$^7$ .............................................. B62K 21/16
(52) U.S. Cl. ..................................... 74/551.8; 74/551.3
(58) Field of Search ........................... 74/551.1–551.9, 74/500.5–502.2

(56) References Cited

U.S. PATENT DOCUMENTS

| | | | | |
|---|---|---|---|---|
| 609,690 | A | * 8/1898 | Mayerson | 74/551.8 |
| 2,004,089 | A | * 6/1935 | Anderson | 74/551.1 |
| 2,168,939 | A | * 8/1939 | Kraeft | 74/551.8 |
| 2,169,256 | A | * 8/1939 | Kraeft | 74/551.8 |
| 2,588,671 | A | * 3/1952 | Tringali | 74/551.8 |
| 4,032,168 | A | * 6/1977 | Emerson | 74/551.1 |
| 5,008,782 | A | * 4/1991 | Murray | 74/551.9 |
| 5,159,712 | A | * 10/1992 | Schneider et al. | D14/189 |
| 5,429,013 | A | * 7/1995 | Taylor et al. | 74/551.1 |
| 5,480,365 | A | * 1/1996 | Lundin et al. | 74/551.3 |
| 5,562,013 | A | * 10/1996 | Kao | 74/551.3 |
| 5,621,382 | A | * 4/1997 | Yamamoto | D12/114 |
| 6,069,788 | A | * 5/2000 | Masui | D10/98 |
| 6,288,633 | B1 | * 9/2001 | Volpe et al. | 280/1.14 |
| 6,305,241 | B1 | * 10/2001 | Masui et al. | 74/551.8 |
| 6,331,089 | B1 | * 12/2001 | Iteya | 74/551.8 |
| 6,367,833 | B1 | * 4/2002 | Horiuchi | 280/260 |

FOREIGN PATENT DOCUMENTS

| | | | |
|---|---|---|---|
| DE | 1092332 | * 11/1960 | 74/551.8 |
| GB | 493023 | * 9/1938 | 74/551.8 |
| IT | 293238 | * 2/1932 | 74/551.5 |

* cited by examiner

Primary Examiner—Chong H. Kim
(74) Attorney, Agent, or Firm—Shinjyu Global IP Counselors, LLP.

(57) ABSTRACT

A bicycle handle mounting member is provided for mounting a handlebar and a display unit thereto. The mounting member includes a stem portion configured to be coupled to a bicycle frame and a handlebar and display unit support portion movably coupled to the stem portion. The handlebar and display unit support portion includes a handlebar clamp and first and second mounting flanges. The handlebar clamp has the handlebar fixedly coupled thereto. The first and second mounting flanges are spaced apart to form a display receiving space with the display unit fixedly coupled therebetween. In the preferring embodiments, the handlebar and the display unit are mount to the bicycle handle mounting member such that the wiring between the display unit and control members mounted to the handlebar are completely concealed.

20 Claims, 7 Drawing Sheets

BICYCLE HANDLE MOUNTING MEMBER

BACKGROUND OF THE INVENTION

1. Field of the Invention

This invention generally relates to a bicycle handle mounting member. More specifically, the present invention relates a bicycle handle mounting member that fixedly secures a handlebar and a display unit.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle.

More specifically, bicycles are being made to be more user friendly and more convenient to operate. One area of the bicycle that is constantly being improved is the controls of the bicycle. The controls are being made to be easier to use, as well as being better designed. For example, bicycle displays are typically mounted on the handlebar as a separate element. These displays can often rotate on the handlebar and thus not be visible to the rider. Moreover, the display units are often offset to one side of the bicycle. Thus, the rider must look sideways in order to view a display unit that is offset to the side of the bicycle. Depending upon the function of the display unit, this may result in the rider frequently having to look for the display unit. Moreover, these display units often have their wires taped or strapped to the handlebars and various frame parts. These wires can often be inadvertently torn from the display unit. Moreover, these wires are often very unsightly.

In view of the above, there exists a need for a bicycle handle mounting member which supports a handlebar and a display unit, and which overcomes the above mentioned problems in the prior art. This invention addresses this need in the prior art as well as other needs, which will become apparent to those skilled in the art from this disclosure.

SUMMARY OF THE INVENTION

One object of the present invention is to provide a bicycle handle mounting member that fixedly secures a handlebar and a display unit in an integrated fashion.

Another object of the present invention is to provide a bicycle handle mounting member in which the wiring between the display unit and the control device or switch is mounted on the handlebar.

The foregoing objects can basically be attained by providing a bicycle handle mounting member comprising a stem portion, and a handlebar and display unit support portion. The stem portion is configured to be coupled to a bicycle frame. The handlebar and display unit support portion is movably coupled to the stem portion. The handlebar and display unit support portion includes a handlebar clamp, and first and second mounting flanges. The and first and second mounting flanges are spaced apart to form a display receiving space therebetween.

The foregoing objects can also be attained by providing a bicycle handlebar assembly comprising a handlebar a display unit, and a mounting member. The mounting member includes a stem portion configured to be coupled to a bicycle frame and a handlebar and display unit support portion coupled to the stem portion. The handlebar and display unit support portion includes a handlebar clamp and first and second mounting flanges. The handlebar clamp has the handlebar fixedly coupled thereto. The first and second mounting flanges are spaced apart to form a display receiving space with the display unit fixedly coupled therebetween.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
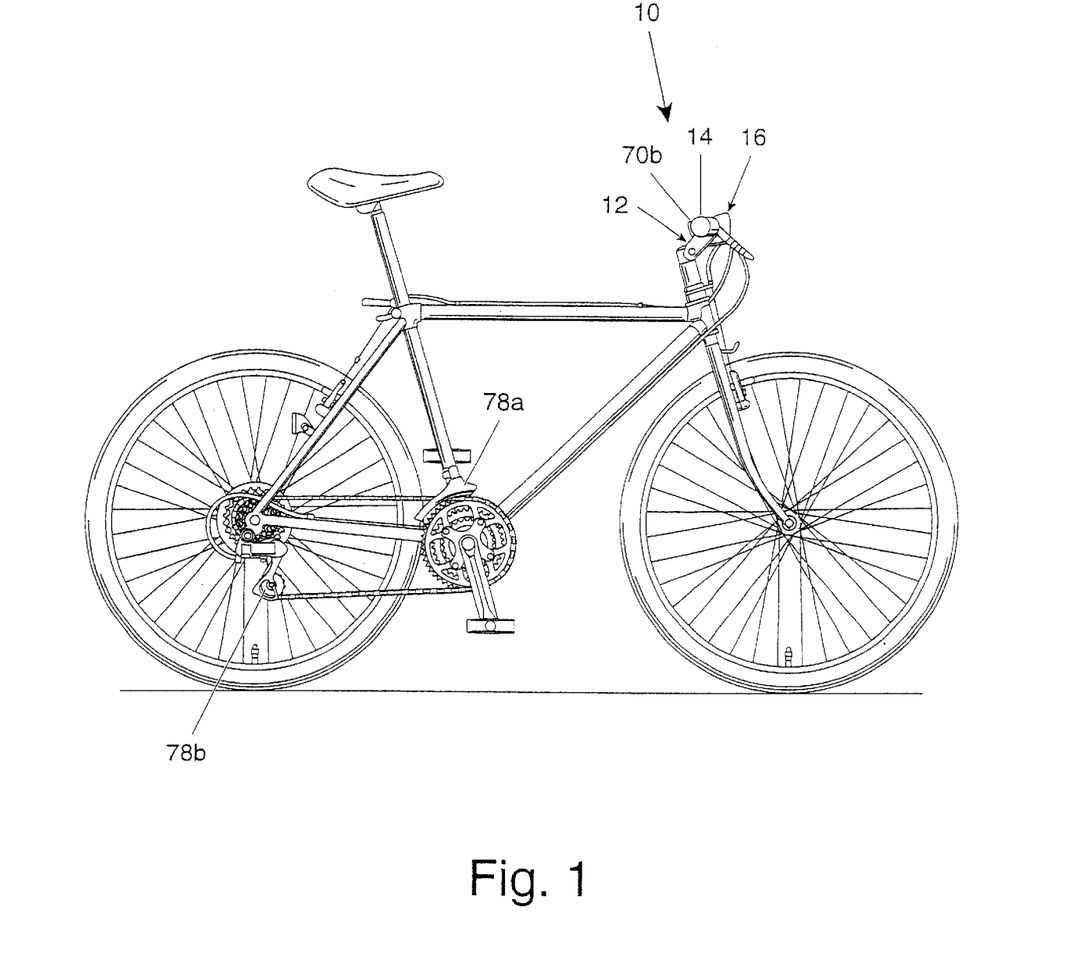
FIG. 1 is a side elevational view of a bicycle with a bicycle handle mounting member in accordance with a first embodiment of the present invention.

Referring initially to FIG. 1, a bicycle 10 is illustrated with a bicycle handle mounting member 12 with a handlebar 14 and a display unit 16 coupled thereto in accordance with a first embodiment of the present invention, as discussed below. Bicycle 10 and its various components are well known in the prior art, except for the handle mounting member 12, handlebar 14 and display unit 16 of the present invention. Thus, bicycle 10 and its various components will not be discussed or illustrated in detail herein, except for the components that relate to the present invention.

As used herein, the following directional terms "forward, rearward, upward, above, downward, vertical, horizontal, below and transverse" as well as any other similar directional terms refer to those directions of a bicycle in its normal riding position, with the bicycle handle mounting member 12 attached thereto. Accordingly, these terms, as utilized to describe the bicycle handle mounting member 12 in the claims, should be interpreted relative to bicycle 10 in its normal riding position.

Figure 2:
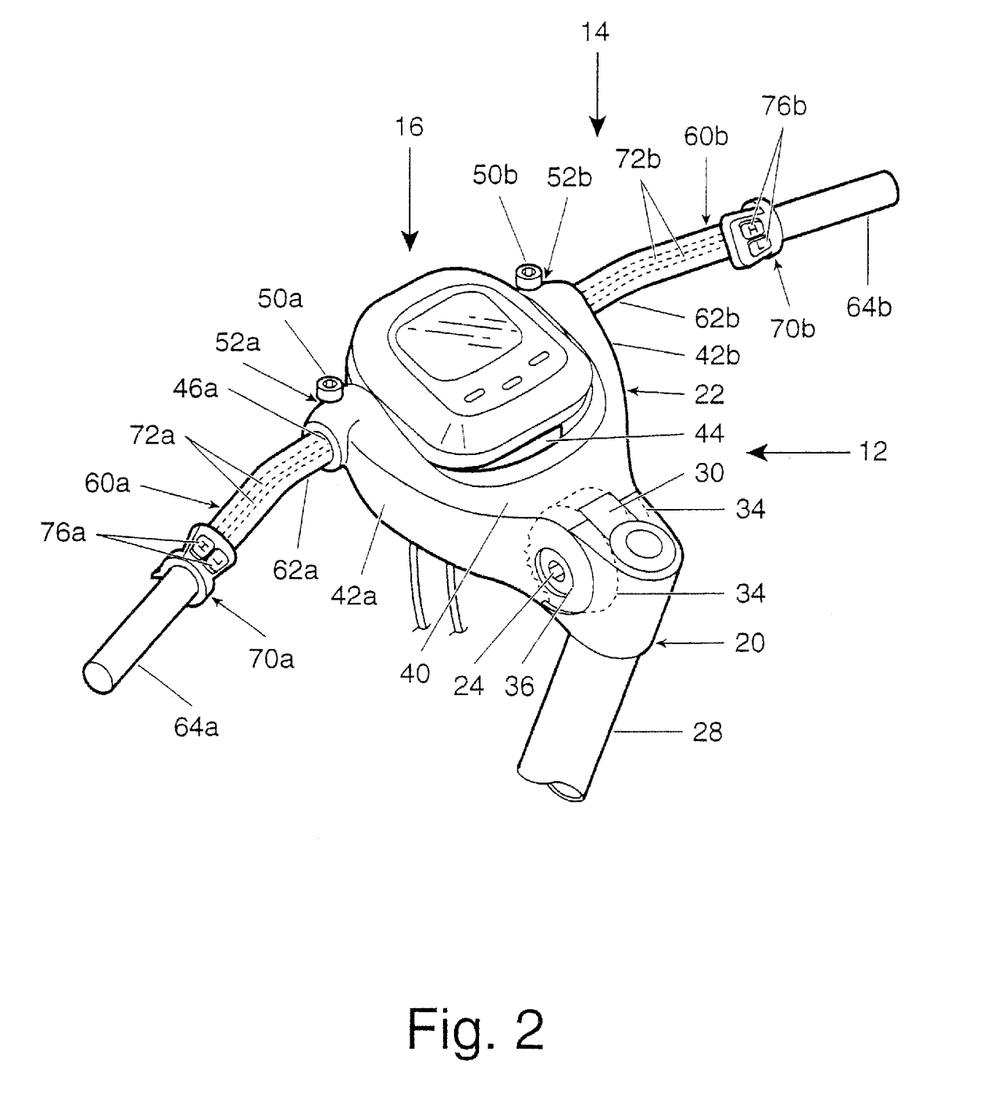
FIG. 2 is a perspective view of the bicycle handle mounting member illustrated in FIG. 1 in accordance with a first embodiment of the present invention.
Figure 3:
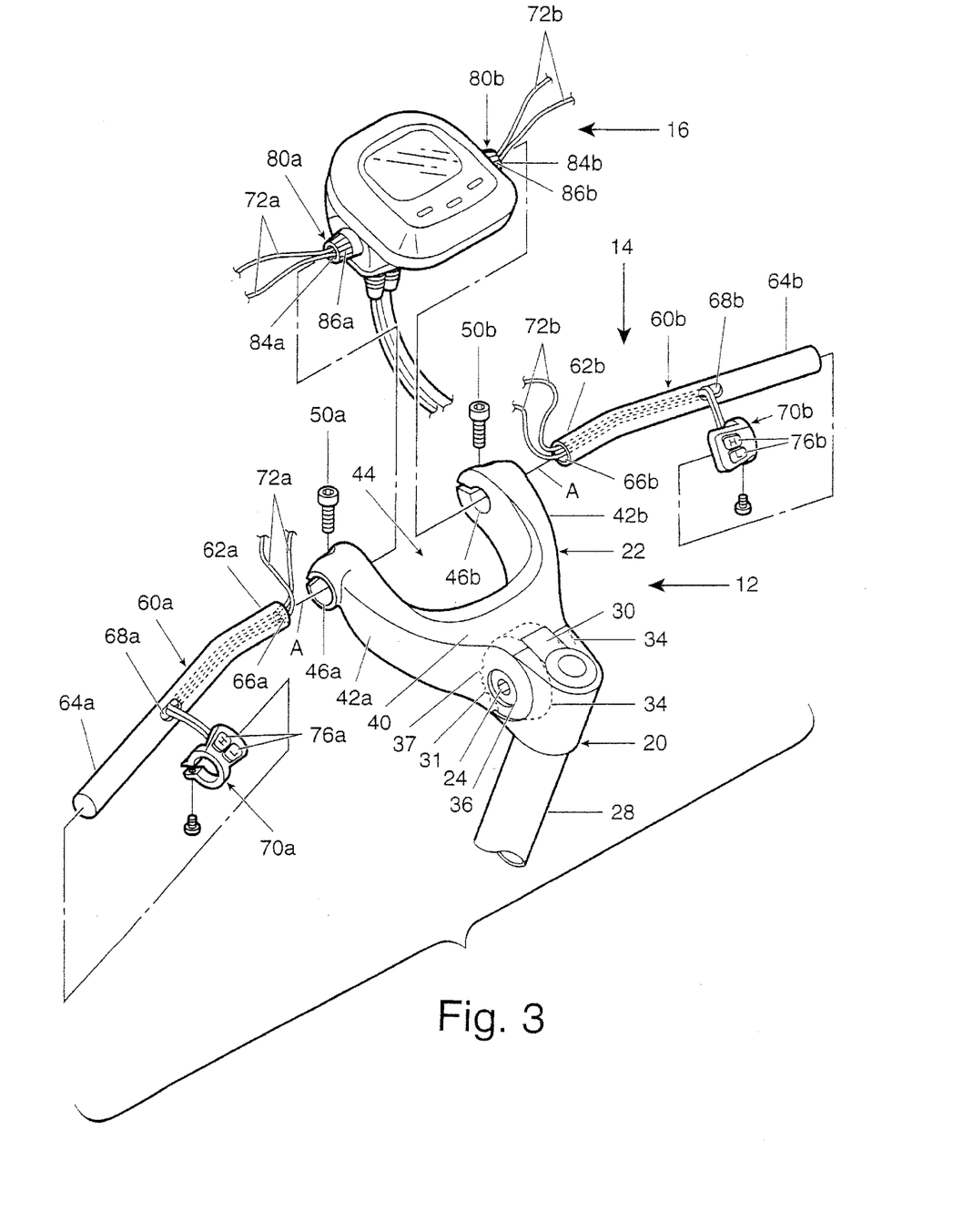
FIG. 3 is an exploded perspective view of the bicycle handle mounting member illustrated in FIG. 2 in accordance with a first embodiment of the present invention.

Referring now to FIGS. 2 and 3, the handle mounting member 12 has a stem portion 20 that is pivotally coupled to a handle bar and display unit support portion 22 via a pivot bolt 24. Preferably, the stem portion 20 and the handlebar and display unit support portion 22 are each constructed of a lightweight rigid material. For example, these elements can be constructed of a lightweight metallic material such as aluminum or titanium.

The stem portion 20 in the illustrated embodiment has a stem mounting post 28 with a flange 30 extending outwardly from the top end of the stem mounting post 28. The stem portion 20 is pivotally coupled to the handle bar and display unit support portion 22 via the pivot bolt 24 passing through a hole (not shown) in the flange 30 of the stem mounting post 28 and holes 36 of the handle bar and display unit support portion 22. Thus, when the pivot bolt 24 is tightened down, the handlebar display unit support portion 22 is held at a predetermined angle relative to the stem portion 20.

The handlebar and display unit support portion 22 is a substantially U-shaped member that has a base section 40 and a pair of leg sections or mounting flanges 42a and 42b that define a display receiving space 44 therebetween. The base section 40 has a pair of flanges 34 that have holes 36 (only one shown) for receiving pivot bolt 24 therein. The flange 30 is located between the flanges 34 and is provided with a serrated surface 31 that engages a corresponding serrated surface 37 of the handlebar and display unit support portion 22 for holding the handlebar and display unit support portion 22 at the desired angle relative to the stem portion 20. Preferably, one of the flanges 34 is threaded so that the bolt 24 squeezes the flanges 34 together against the flange 30 located therebetween.

The free ends of the first and second mounting flanges 42a and 42b have handlebar receiving openings or bores 46a and 46b for mounting handlebar 14 thereto, as discussed below. The handlebar receiving bores 46a and 46b are split bores in which the diameter of the bore is adjusted by bolts 50a and 50b in a conventional manner. Accordingly, the handlebar receiving bores 46a and 46b and the bolts 50a and 50b form first and second clamping portions 52a and 52b. In this embodiment, the handlebar receiving bores 46a and 46b have longitudinal center axes A that are axially aligned with each other. The handlebar receiving bores 46a and 46b also support the display unit 16, as explained below.

The handlebar 14 in this embodiment is preferably constructed of two separate tubular sections 60a and 60b. Preferably, the tubular sections 60a and 60b are substantially identical to each other, except for that they are minor images of each other. Tubular section 60a has a first attachment end 62a and a second free end 64a. The attachment end 62a is clamped in first clamping portion 52a, while the second free end 64a extends outwardly therefrom. The tubular section 60a is hollow and has an inner serrated surface 66a at the first attachment end 62a. Preferably, the inner serrated surface 66a has a substantially truncated cone shape such that the diameter of the inner serrated surface 66a is widest at the opening of the first attachment end 62a and then gradually reduces as it extends into the tubular section 60a. This serrated inner surface 66a is designed to non-rotatably hold the display unit 16, as explained below.

The tubular section 60a is provided with an opening 68a that is normally covered by a switch or control device 70a. This arrangement allows the display unit 16 to be wired to the switch or control device 70a without the wires 72a being exposed. In other words, the wires 72a are completely concealed within the interior of tubular section 60a between the display unit 16 and the switch or control device 70a.

The tubular section 60b has a first attachment end 62b and a second free end 64b. The attachment end 62b is clamped in second clamping portion 52b, while the second free end 64b extends outwardly therefrom. The tubular section 60b is hollow and has an inner serrated surface 66b at the first attachment end 62b. Preferably, the inner serrated surface 66b has a substantially truncated cone shape, similar to the inner serrated surface 66a. This serrated inner surface 66b is designed to non-rotatably hold the display unit 16, as explained below.

The tubular section 60b is provided with an opening 68b that is normally covered by a switch or control device 70b. This arrangement allows the display unit 16 to be wired to the switch or control device 70b without the wires 72b being exposed. In other words, the wires 72b are completely concealed within the interior of tubular section 60b between display unit 16 and switch or control device 70b.

Turning now to the display unit 16, preferably, the display unit 16 is a cycle computer that provides various information to the rider and that is operated by one or more control devices 70a and/or 70b. More preferably, the display unit 16 is a cycle computer that also operates electrically controlled derailleurs 78a and 78b via shift buttons 76a and 76b. Of course, it will be apparent to those skilled in the art from this disclosure that the cycle computer and the control devices 70a and 70b can have a variety of configurations, as needed and/or desired.

Thus, the drive train of bicycle 10 is basically operated or electronically controlled by the display unit 16. The display unit 16 preferably includes a microcomputer formed on a printed circuit board that is powered by a battery unit. The microcomputer of the display unit 16 includes a central processing unit (CPU), a random access memory component (RAM), a read only memory component (ROM), and an I/O interface. The various components of the microcomputer are well known in the bicycle field. Therefore, the components used in the microcomputer of the display unit 16 will not be discussed or illustrated in detail herein. Moreover, it will be apparent to those skilled in the art from this disclosure that the display unit 16 can include various electronic components, circuitry and mechanical components to carryout the present invention.

Display unit 16 has a pair of support tubes 80a and 80b that are received in handlebar receiving bores 46a and 46b and into the first attachment ends 62a and 62b of the tubular sections 60a and 60b of the handlebar 14. More specifically, the first and second support tubes 80a and 80b have axially extending bores 84a and 84b and outer serrated surfaces 86a and 86b, respectively. The outer serrated surfaces 86a and 86b have a substantially truncated cone shape that corresponds to the inner serrated surfaces 66a and 66b of the tubular sections 60a and 60b. Thus, the inner serrated surfaces 66a and 66b mate with the outer serrated surfaces 86a and 86b to prevent relative rotation therebetween. Accordingly, the wires 72a and 72b from the display unit 16 extend outwardly through the internal bores 84a and 84b, and into the interior of tubular sections 60a and 60b. The wires 72a and 72b then extend out of the openings 68a and 68b of the tubular sections 60a and 60b where they are operatively coupled to the control devices 70a and 70b, respectively. Accordingly, the wires 72a and 72b are completely sealed between the display unit 16 and the control devices 70a and 70b.

SECOND EMBODIMENT

Figure 4:
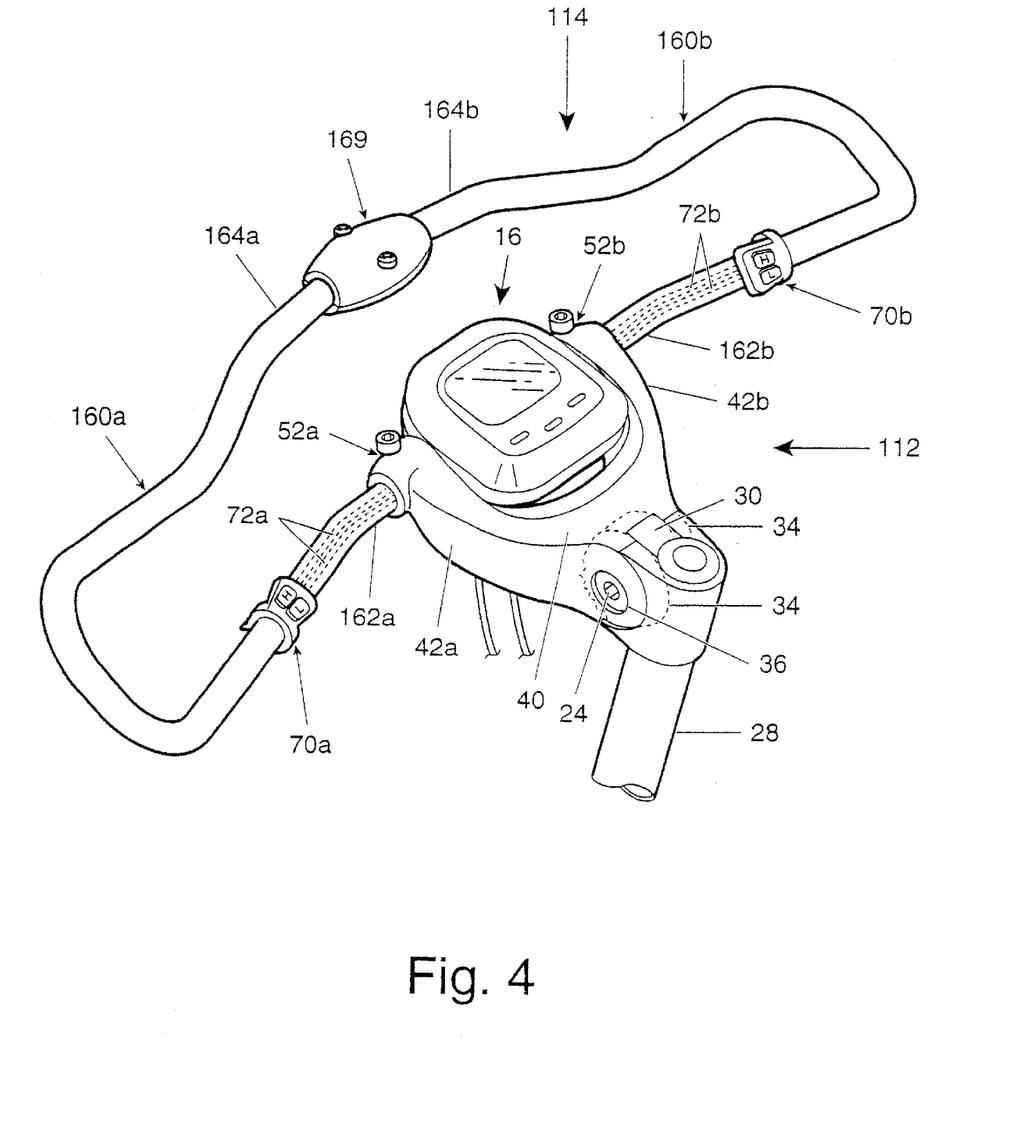
FIG. 4 is a perspective view of a bicycle handle mounting member in accordance with a second embodiment of the present invention.
Figure 5:
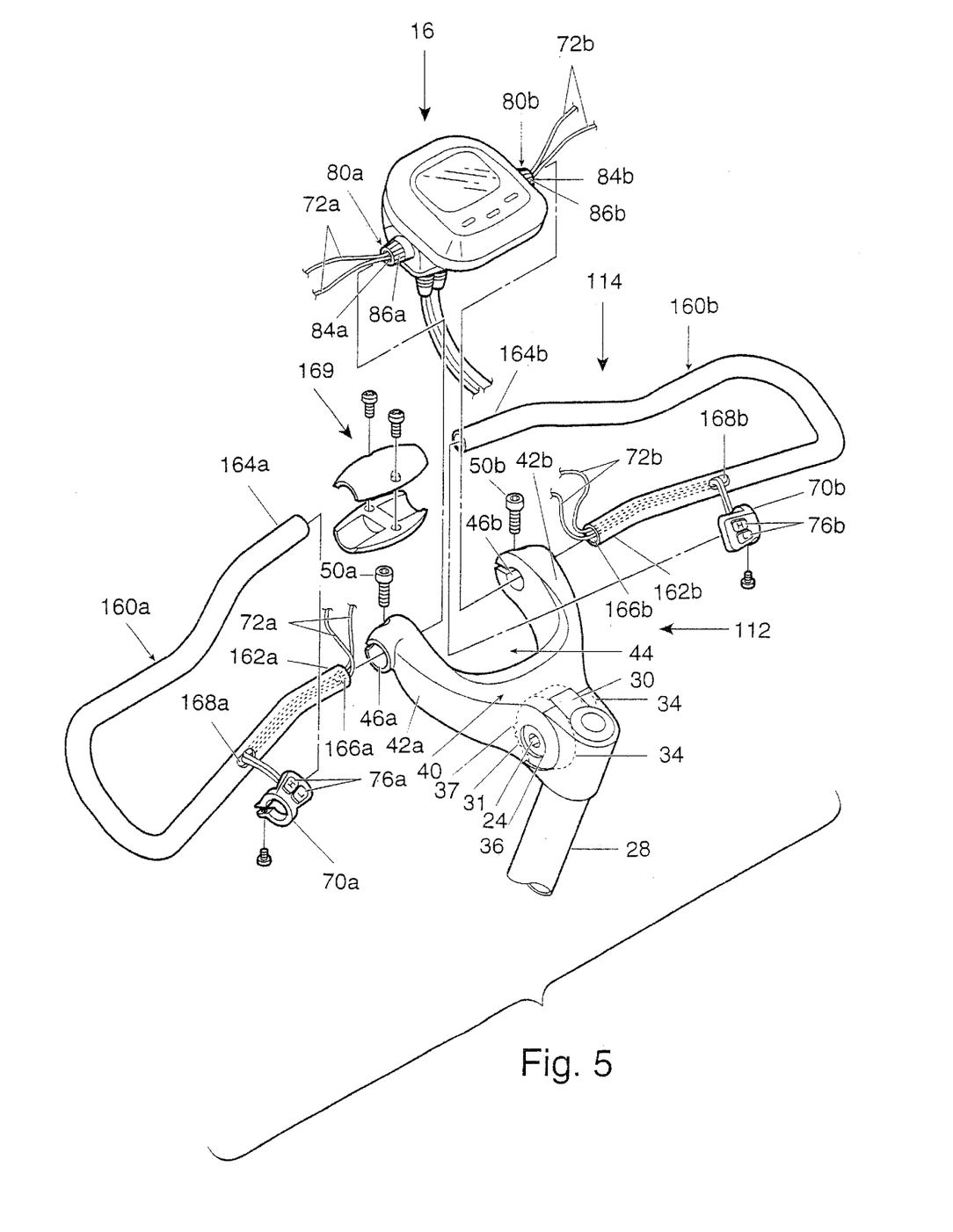
FIG. 5 is an exploded perspective view of the bicycle handle mounting member illustrated in FIG. 4 in accordance with the second embodiment of the present invention.

Referring now to FIGS. 4 and 5, the bicycle handle mounting member 12 is illustrated with a looped shaped handlebar 114 in accordance with a second embodiment and adapted to be mounted on bicycle 10 in a conventional manner. This second embodiment is substantially identical to the first embodiment, except that the handlebar 14 of the first embodiment has been replaced with the looped shaped handlebar 114. In view of the similarities between the second embodiment and the first embodiment, this second embodiment will not be discussed or illustrated in detail herein. Rather, it will be apparent to those skilled in the art from this disclosure that identical or similar structures of this embodiment operate in an identical or substantially identical manner as in the first embodiment.

The handlebar 114 in this embodiment is preferably constructed of two separate tubular sections 160a and 160b. Preferably, the tubular sections 160a and 160b are substantially identical to each other, except for that they are mirror images of each other. The tubular section 160a has a first attachment end 162a and a second end 164a. Likewise, the tubular section 160b has a first attachment end 162b and a second end 164b. In this embodiment, the second ends 164a and 164b are coupled together by a joining member 169.

The attachment ends 162a and 162b are clamped in first and second clamping portions 52a and 52b, respectively. The attachment ends 162a and 162b have inner serrated surfaces 166a and 166b. Preferably, the inner serrated surfaces 166a and 166b have substantially truncated cone shapes. These serrated inner surface surfaces 166a and 166b are designed to non-rotatably hold the display unit 16, in the same manner as the first embodiment.

The tubular sections 160a and 160b are provided with openings 168a and 168b that are normally covered by the switches or control devices 70a and 70b. This arrangement allows the display unit 16 to be wired to the switches or control devices 70a and 70b without the wires 72a and 72b being exposed. In other words, the wires 72a and 72b are completely concealed within the interior of tubular sections 160a and 160a between the display unit 16 and the switches or control devices 70a and 70b.

THIRD EMBODIMENT

Figure 6:
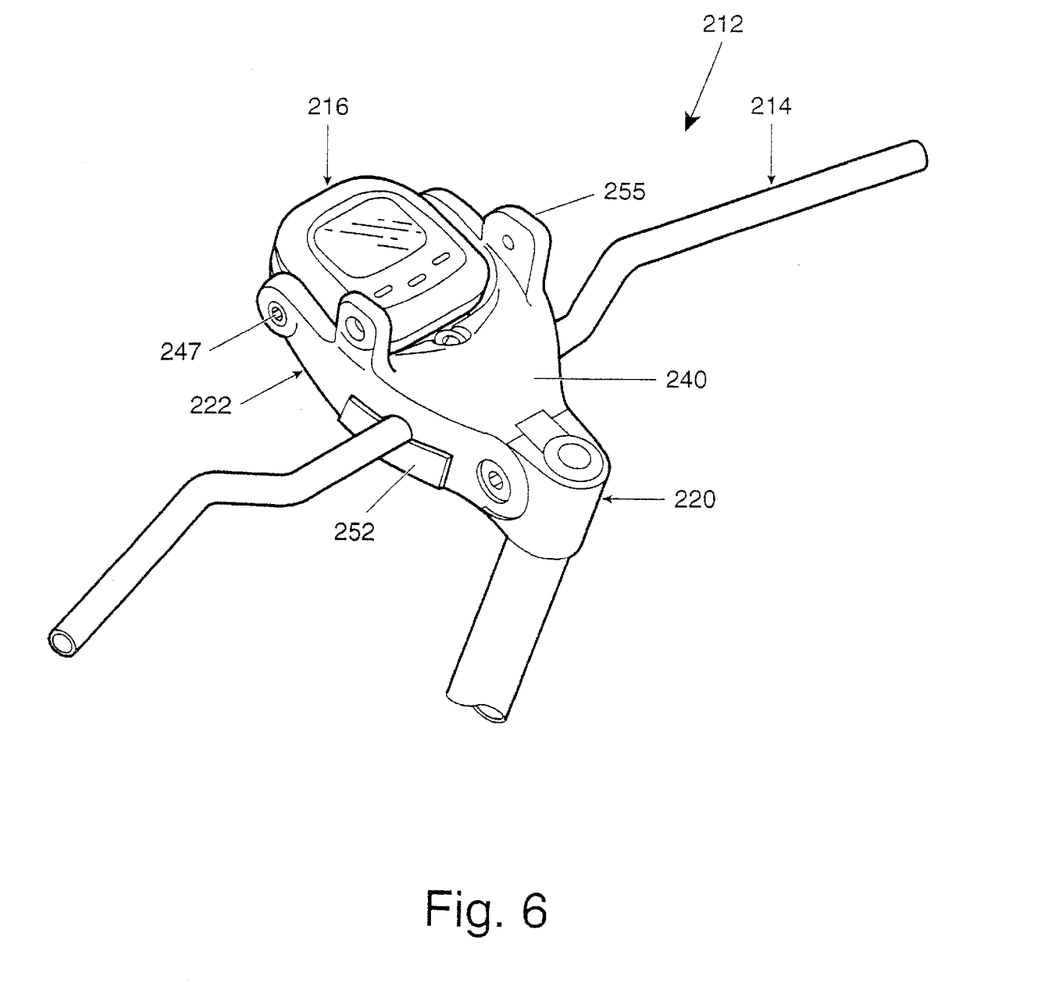
FIG. 6 is a perspective view of a bicycle handle mounting member in accordance with a third embodiment of the present invention.
Figure 7:
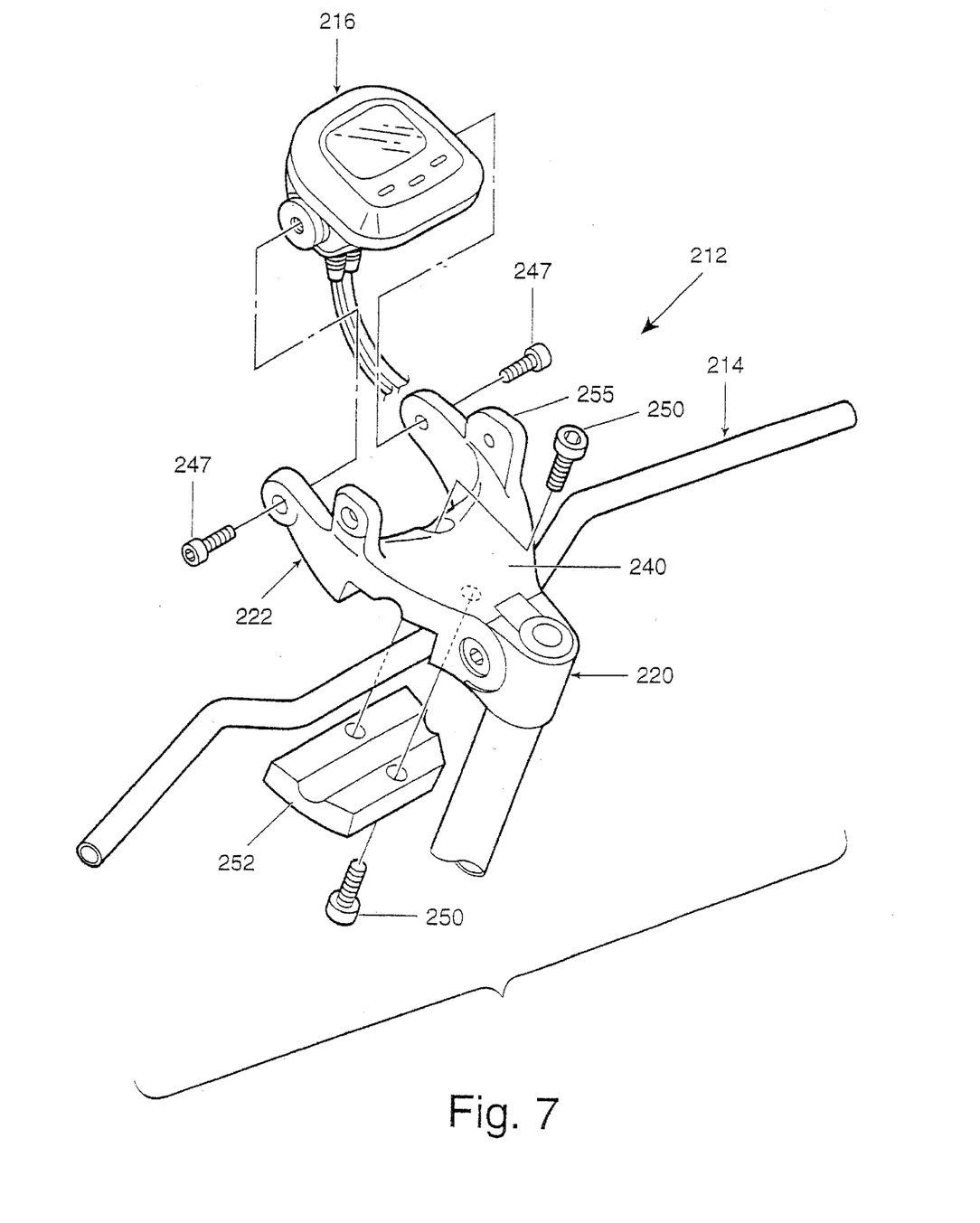
FIG. 7 is an exploded perspective view of the bicycle handle mounting member in accordance with the third embodiment of the present invention.

Referring now to FIGS. 6 and 7, a bicycle handle mounting member 212 is illustrated in accordance with a third embodiment of the present invention and adapted to be coupled to bicycle 10 in a conventional manner. This third embodiment has modified mounting structures for supporting the handlebar 214 and the display unit 216. In view of the similarities between this embodiment and the prior embodiment, this embodiment will not be discussed or illustrated in detail herein except to explain the differences between the two embodiments.

In this embodiment, the stem portion 220 is identical to stem portion 20 of the first embodiment, while the handlebar display unit support portion 222 is modified. The handlebar and display unit support portion 222 is modified such that the handlebar 214 and the display unit 216 are mounted in a different manner. More specifically, a separate clamping member 252 is fastened to the base section 240 of the handlebar and display unit support portion 222 via a pair of bolts 250. Of course, the clamping member 252 could be made integral with the remaining portions of the base section 240. Moreover, the handlebar and display unit support portion 222 is also provided with a pair of additional mounting flanges 255 for mounting other accessories, such as a safety pad, etc. In this embodiment the display unit 216 is attached to openings 246 via a pair of fasteners or bolts 247.

The terms of degree such as "substantially", "about" and "approximately" as used herein mean a reasonable amount of deviation of the modified term such that the end result is not significantly changed. These terms should be construed as including a deviation of ±5% of the modified term if this would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A bicycle handle mounting member comprising:
    a stem portion configured to be coupled to a bicycle frame; and
    a substantially U-shaped handlebar and display unit support portion coupled to said stem portion, said handlebar and display unit support portion including
        a handlebar clamp,
        a base section, and
        first and second mounting flanges that extend from said base section and are spaced apart to form a display receiving space therebetween, said base section and said first and second mounting flanges being formed as a one-piece unitary member, said first and second mounting flanges having first
        and second receiving bores, respectively, said first and second receiving bores having longitudinal center axes that are substantially aligned,
    said stem portion being angularly adjustable relative to said handlebar and display unit support portion about a pivot axis.

2. A bicycle handle mounting member according to claim 1, wherein
    said handlebar clamp is formed at said base section of said handlebar and display unit support portion.

3. A bicycle handle mounting member according to claim 2, wherein
    said handlebar clamp includes a clamp member that is fastened to said base section of said handlebar and display unit support portion.

4. A bicycle handle mounting member according to claim 1, wherein
    said handlebar clamp includes a first clamping portion having said first receiving bore formed on said first mounting flange, and a second clamping portion having said second receiving bore formed on said second mounting flange.

5. A bicycle handle mounting member according to claim 4, wherein
    said handlebar clamp further includes first and second fasteners for adjusting diameters of said first and second receiving bores, respectively.

6. A bicycle handlebar assembly comprising:
    a handlebar;
    a display unit; and
    a mounting member including a stem portion configured to be coupled to a bicycle frame and a handlebar and display unit support portion coupled to said stem portion, said handlebar and display unit support portion including
        a handlebar clamp with said handlebar fixedly coupled thereto, and
        first and second mounting flanges that are spaced apart to form a display receiving space with said display unit fixedly coupled therebetween, said first and second mounting flanges having first and second receiving bores with said display unit coupled thereto, said display unit and said first and second receiving bores being arranged and configured so that said display unit is angularly adjustable relative to said handlebar and display unit support portion, said stem portion being angularly adjustable relative to said handlebar and display unit support portion about a pivot axis.

7. A bicycle handlebar assembly according to claim 6, wherein said handlebar clamp.is formed at a base section of said handlebar and display unit support portion that is located between said first and second mounting flanges.

8. A bicycle handlebar assembly according to claim 7, wherein said handlebar clamp includes a clamp member that is fastened to said base section of said handlebar and display unit support portion.

9. A bicycle handlebar assembly according to claim 6, wherein said handlebar clamp includes a first clamping portion having said first receiving bore formed on said first mounting flange, and a second clamping portion having said second receiving bore formed on said second mounting flange.

10. A bicycle handlebar assembly according to claim 9, wherein said first and second receiving bores have longitudinal center axes that are aligned.

11. A bicycle handlebar assembly according to claim 10 wherein said handlebar clamp further includes first and second fasteners for adjusting diameters of said first and second receiving bores, respectively.

12. A bicycle handlebar assembly comprising:

a handlebar a display unit; and a mounting member including a stem portion configured to be coupled to a bicycle frame and a handlebar and display unit support portion coupled to said stem portion said handlebar and display unit support portion including a handlebar clamp with said handlebar fixedly coupled thereto, and first and second mounting flanges that are spaced apart to form a display receiving space with said display unit fixedly coupled therebetween, said handlebar clamp including a first clamping portion with a first bar receiving opening formed on said first mounting flange, and a second clamping portion with a second bar receiving opening formed on said second mounting flange, said first and second bar receiving openings having longitudinal center axes that are aligned, said display unit including first and second support tubes located in said first and second bar receiving openings, respectively.

13. A bicycle handlebar assembly according to claim 12, wherein said first and second support tubes have outer serrated surfaces.

14. A bicycle handlebar assembly according to claim 13, wherein said handlebar has a first attachment end with an inner serrated surface engaging said outer serrated surface of said first support tube, and a second attachment end with an inner serrated surface engaging said outer serrated surface of said second support tube.

15. A bicycle handlebar assembly according to claim 14, wherein said handlebar includes at least first and second separate tubular sections with said first tubular section having said first attachment end and a first free end, and said second tubular section having said second attachment end and a second free end.

16. A bicycle handlebar assembly according to claim 14, wherein said handlebar includes at least first and second separate tubular sections with said first tubular section having said first attachment end and a first joined end, and said second tubular section having said second attachment end and a second joined end coupled to said first joined end by a joining member.

17. A bicycle handlebar assembly according to claim 13, wherein said handlebar has a first attachment end substantially axially aligned with said first support tube, and a second attachment end substantially axially aligned with an inner serrated surface engaging said outer serrated surface of said second support tube.

18. A bicycle handlebar assembly according to claim 17, wherein said handlebar further includes at least one control device coupled thereto with wiring operatively coupled between said display unit and said control device, said wiring extending through an interior section of said handlebar between said display unit and said control device.

19. A bicycle handle mounting member according to claim 5, wherein said first and second receiving bores are split receiving bores.

20. A bicycle handlebar assembly comprising:

a handlebar;

a display unit; and a mounting member including a stem portion configured to be coupled to a bicycle frame and a handlebar and display unit support portion coupled to said stem portion, said handlebar and display unit support portion including a handlebar clamp with said handlebar fixedly coupled thereto, and first and second mounting flanges that are spaced apart to form a display receiving space with said display unit fixedly coupled therebetween, said first and second mounting flanges having first and second openings with said display unit coupled thereto, said display unit having an internal bore that is substantially aligned with one of said first and second openings to form a wire passageway from within said display unit outwardly through said internal bore and into said one of said first and second openings.

* * * * *